(12) United States Patent
Stewart et al.

(10) Patent No.: US 8,074,676 B2
(45) Date of Patent: Dec. 13, 2011

(54) SHUT OFF COVER

(76) Inventors: Nicolina A. Stewart, Bradenton, FL (US); Kenneth G. Stewart, III, Bradenton, FL (US)

(*) Notice: Subject to any disclaimer, the term of this patent is extended or adjusted under 35 U.S.C. 154(b) by 200 days.

(21) Appl. No.: 12/351,964

(22) Filed: Jan. 12, 2009

(65) Prior Publication Data

US 2009/0120509 A1    May 14, 2009

Related U.S. Application Data

(62) Division of application No. 11/150,153, filed on Jun. 13, 2005, now Pat. No. 7,475,702.

(51) Int. Cl.
*E03B 1/04* (2006.01)
(52) U.S. Cl. .................... 137/377; 137/382
(58) Field of Classification Search .............. 137/377, 137/382; 4/654; 248/60, 62
See application file for complete search history.

(56) References Cited

U.S. PATENT DOCUMENTS

| | | | |
|---|---|---|---|
| 1,023,460 A | 4/1912 | Dustman | |
| 2,592,208 A | 4/1952 | Stamper | |
| 2,805,795 A | 9/1957 | Barnes | |
| 3,173,579 A * | 3/1965 | Curie et al. ............. | 222/105 |
| 3,199,121 A | 8/1965 | Greto | |
| 3,369,691 A | 2/1968 | Wei | |
| 3,821,790 A | 6/1974 | Perry | |
| 3,831,802 A | 8/1974 | Chambers et al. | |
| 4,301,828 A | 11/1981 | Martin, Jr. | |
| 4,353,139 A | 10/1982 | Wainwright et al. | |
| 5,024,249 A | 6/1991 | Botsolas | |
| 5,363,517 A | 11/1994 | Botsolas | |
| 5,377,876 A | 1/1995 | Smernoff | |
| 5,675,847 A | 10/1997 | Pierre | |
| 5,954,099 A * | 9/1999 | Princiotta et al. ........ | 141/18 |
| 6,086,029 A * | 7/2000 | Oliver ................. | 248/200.1 |
| 6,205,598 B1 | 3/2001 | Black et al. | |
| 6,209,749 B1 * | 4/2001 | Guess .................. | 220/724 |
| 6,237,788 B1 | 5/2001 | Shuen | |
| 6,530,576 B1 * | 3/2003 | Earl et al. .............. | 277/615 |
| 6,807,691 B1 | 10/2004 | Hertz | |

* cited by examiner

*Primary Examiner* — Stephen M Hepperle
*Assistant Examiner* — Kevin Murphy
(74) *Attorney, Agent, or Firm* — Barnes & Thornburg LLP

(57) ABSTRACT

A shut off cover removably attachable to a water shut off valve for protecting and decoratively covering the shut off valve.

16 Claims, 6 Drawing Sheets

SHUT OFF COVER

CROSS-REFERENCE TO RELATED APPLICATIONS

This application is a Divisional of U.S. patent application Ser. No. 11/150,153, filed Jun. 13, 2005 now U.S. Pat. No. 7,475,702, which is incorporated herein by reference in its entirety.

BACKGROUND OF THE INVENTION

1. Field of the Invention

The invention relates to a shut off cover for covering and protecting a shut off valve extending from a wall surface.

The cover provides protection and a decorative covering for plumbing. The cover is easily attached to, and removed from, the plumbing and has a removable cover for access to a valve. The valve is typically a valve to control water flow, but may control flow of other materials such as gas, etc.

2. Description of the Related Technology

U.S. Pat. No. 4,353,139 is directed to a protective cover for individual water fixtures. The protective cover is of entirely soft, deformable, cushioning material such as high density, closed cell foam rubber or plastic and is of elongated, hollow tubular configuration. In one embodiment there is an outer imperforate, closed end, a cylindrical side wall, and an inner open end so that it may be sleeved over a water spout. Another embodiment fits over a hot or cold water valve handle.

U.S. Pat. No. 4,301,828 discloses a protective cover device for use in maintaining the inlet and/or outlet valves mounted in a wall of a liquid storage tank in a contaminant-free state.

SUMMARY OF THE INVENTION

The invention is directed to a device for covering a shut off valve extending from a wall surface. For example, a shut off valve extending from the wall near the base of a bathroom commode tank or near a bathroom sink. The shut off valve is useful for turning the water off when repairs or problems occur with the commode tank, sink or other fixture. It is advantageous to cover the valve to protect the valve and to provide a decorative covering.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
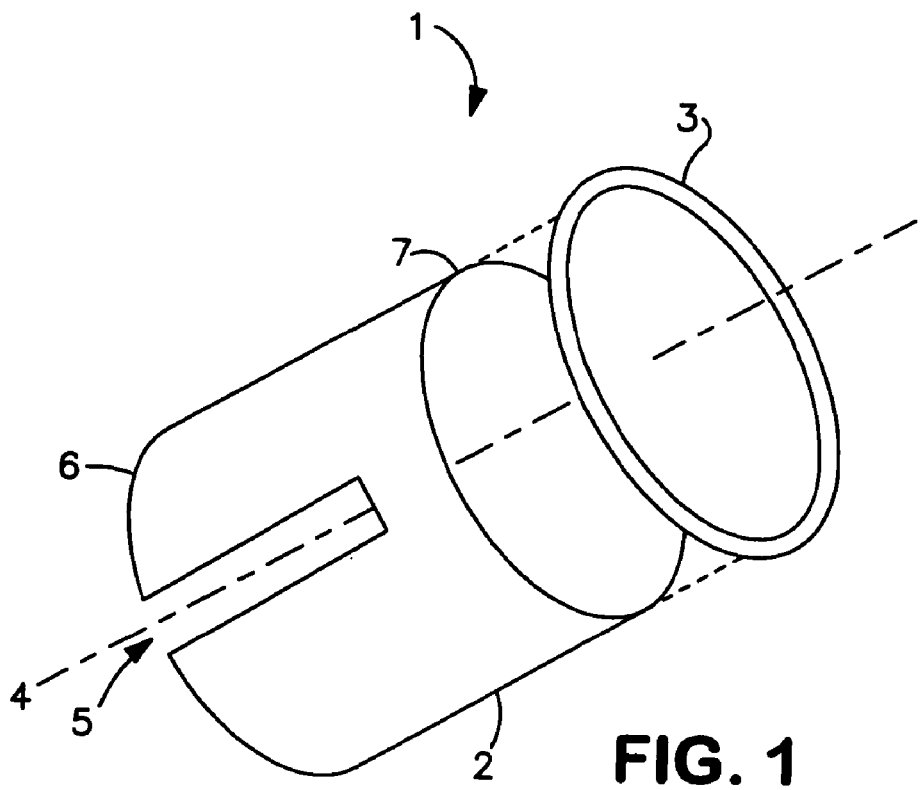
FIG. 1 shows a perspective view of one embodiment of the invention.
Figure 2:
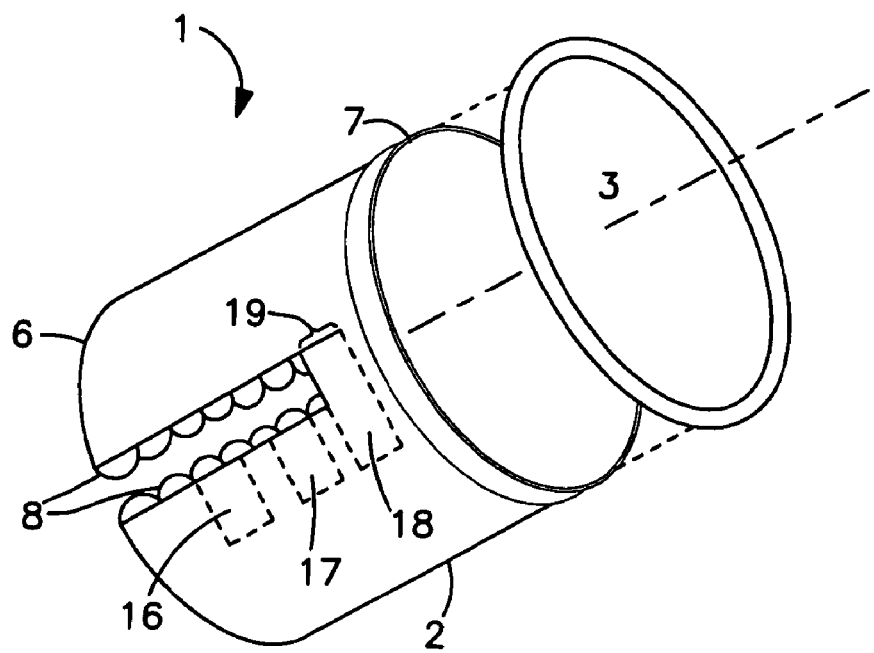
FIG. 2 shows a perspective view of the embodiment of FIG. 1 with a first type of protrusion.
Figure 3:
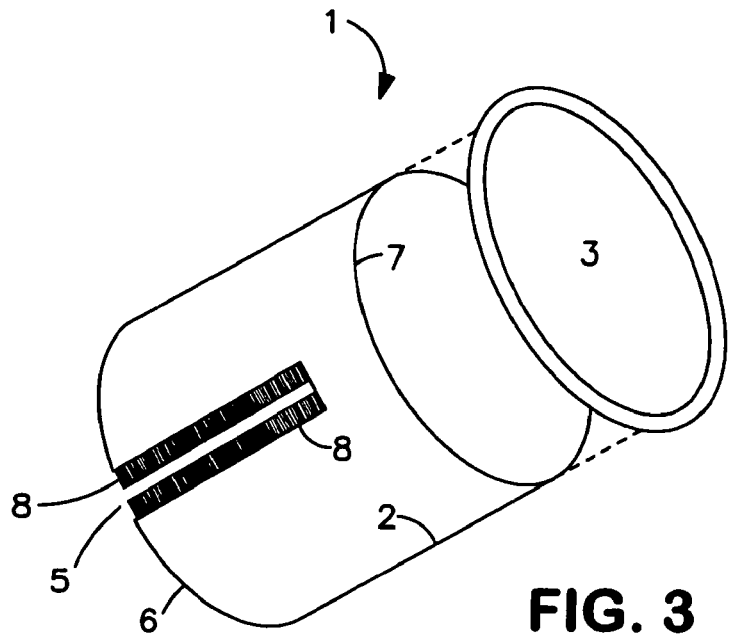
FIG. 3 shows a perspective view of the embodiment of FIG. 1 with a second type of protrusion.

The first embodiment of the invention provides a shut off cover 1 including a cylindrical member 2 having a cap 3, a longitudinal axis 4 and a channel 5. A seen in FIG. 1 channel 5 extends generally parallel to the longitudinal axis 4 with one end of the channel beginning at an end 6 of the cylindrical member 2 and extending toward, but short of, the opposite end 7 of the cylindrical member 2. The end 6 and the opposite end 7 are smooth so as not to cut the fingers of persons handling the shut off cover 1. The channel 5 may be open (FIG. 1) or lined with flexible protrusions 8 (FIGS. 2 and 3) that flex to permit the cover 1 to fit onto a pipe 9 (see FIG. 6) with the sides of the channel 5 or the protrusions 8 snugly engaging the pipe 9. The snug engagement between the pipe 9 and the channel 5 or protrusions 8 hold the cover 1 in place over a shut off valve 13. Protrusions 8 in FIG. 2 are in the form of bumps made of, for example, rubber, foam or plastic. Protrusions 8 in FIG. 3 are in the form of brush-like fibers made of, for example, rubber or plastic. The protrusions 8 may be made from a material different from the cylindrical member 2 and affixed to the channel by adhesion or fasteners, etc. Or the protrusions 8 may be monolithic with the cylindrical member with the protrusions 8 being formed as part of the cylindrical member 8.

Figure 4:
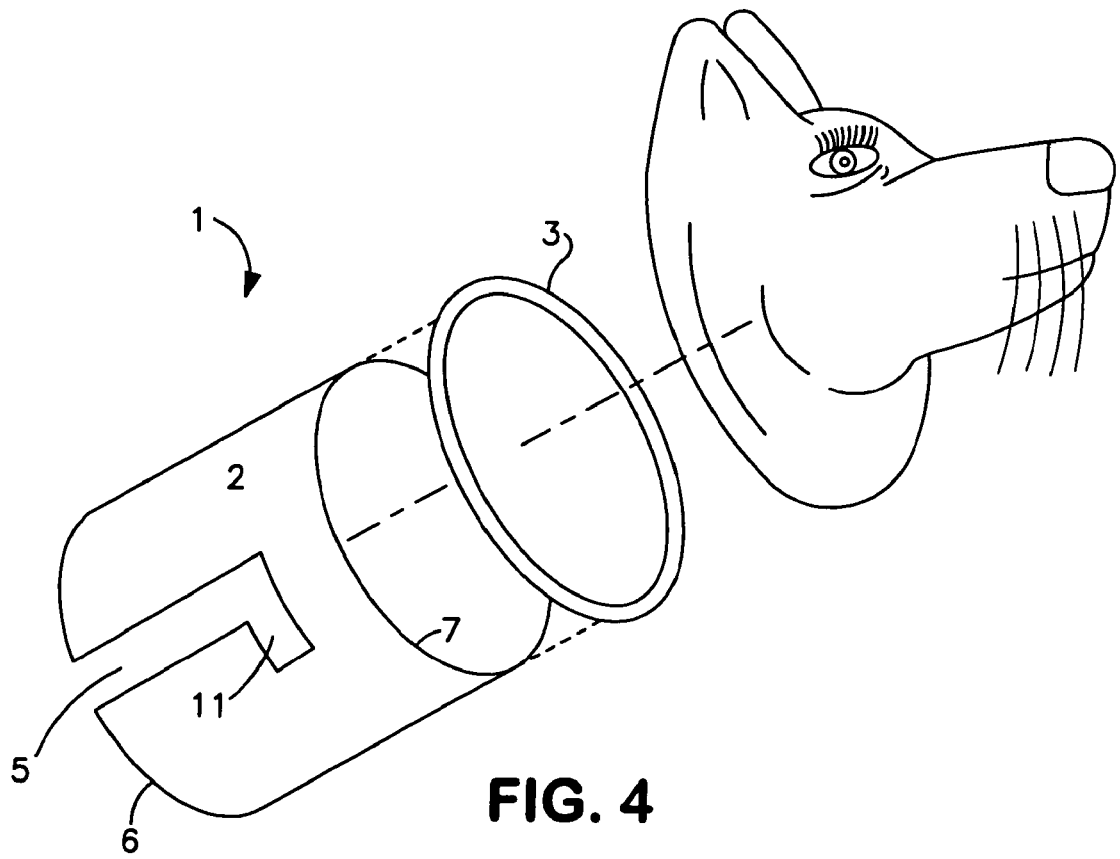
FIG. 4 is perspective view of another embodiment of the invention.

As seen in FIG. 4 the channel 5 can be "L" shaped. The "L" shape provides another way to hold the shut off cover 1 in place on the shut off valve 13. The shut off cover 1 is fit over the shut off valve 13 with the channel 5 aligned with pipe 9 in channel 5. The cover is moved so that pipe 9 travels to the end of channel 5. Then cylindrical member 2 is turned about axis 4 so that pipe 9 moves into the base 11 of the "L" portion of the channel (see FIG. 7). In this position the cylindrical member 2 is held in place by the end 6 in engagement with the wall 12 and the base 11 in engagement with the pipe 9. The cylindrical member 2 may also be supported by engagement of the inner cylindrical surface with the valve 13 and/or horizontal supply pipe 14. In the embodiment of FIGS. 2 and 3 the protrusions 8 may be provided in one or both of channel 5 and base 11.

Cylindrical member 2 and cap 3 are made from colored or colorable material. For example, the member 2 and cap 3 may be made from plastic that accepts paint to provide a desired color. The member 2 and cap 3 may be made from a colored plastic (e.g., white). Cylindrical member 2 may also be made of metal (brass, aluminum, etc.), ceramic, wood, or other materials. Any material that is decorative (e.g., provides a chrome or brass type finish) and functional is possible. Providing the cylindrical member 2 with decorative decals, appliqué or wall paper is also desirable. Cylindrical members 2 in a decorative shape, e.g., a dog, a football, the head of a person, etc. are also anticipated by this disclosure. The cover 3 can be in a complimentary form (e.g., the cylindrical member 2 can be the body of a dog with the cap being the dog's head, etc.) and can be attached to the cylindrical member 2 via snap fit (see the rounded portion at end 7 in FIG. 2), threaded fit (not shown), etc., such types of connection being conventional. The cap can depict a decorative shape by itself without the aid of the cylindrical member.

Figure 5:
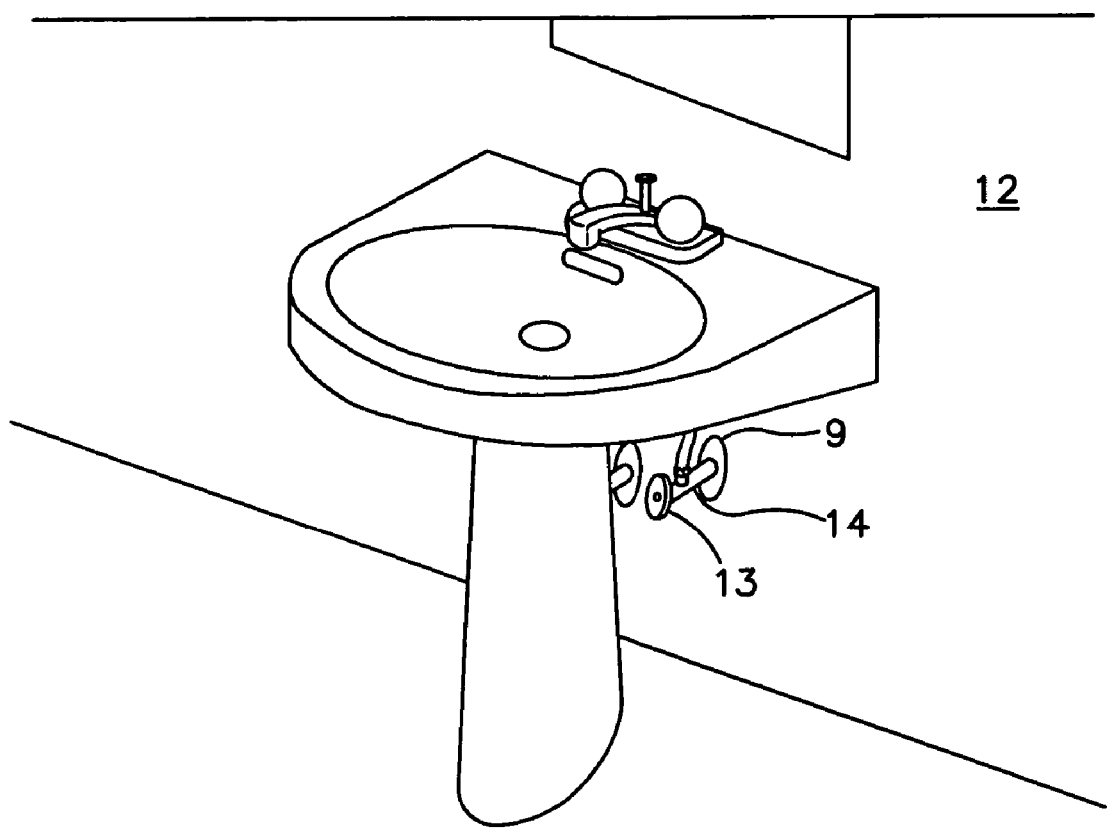
FIG. 5 is perspective view of a typical sink and shut off valves.
Figure 6:
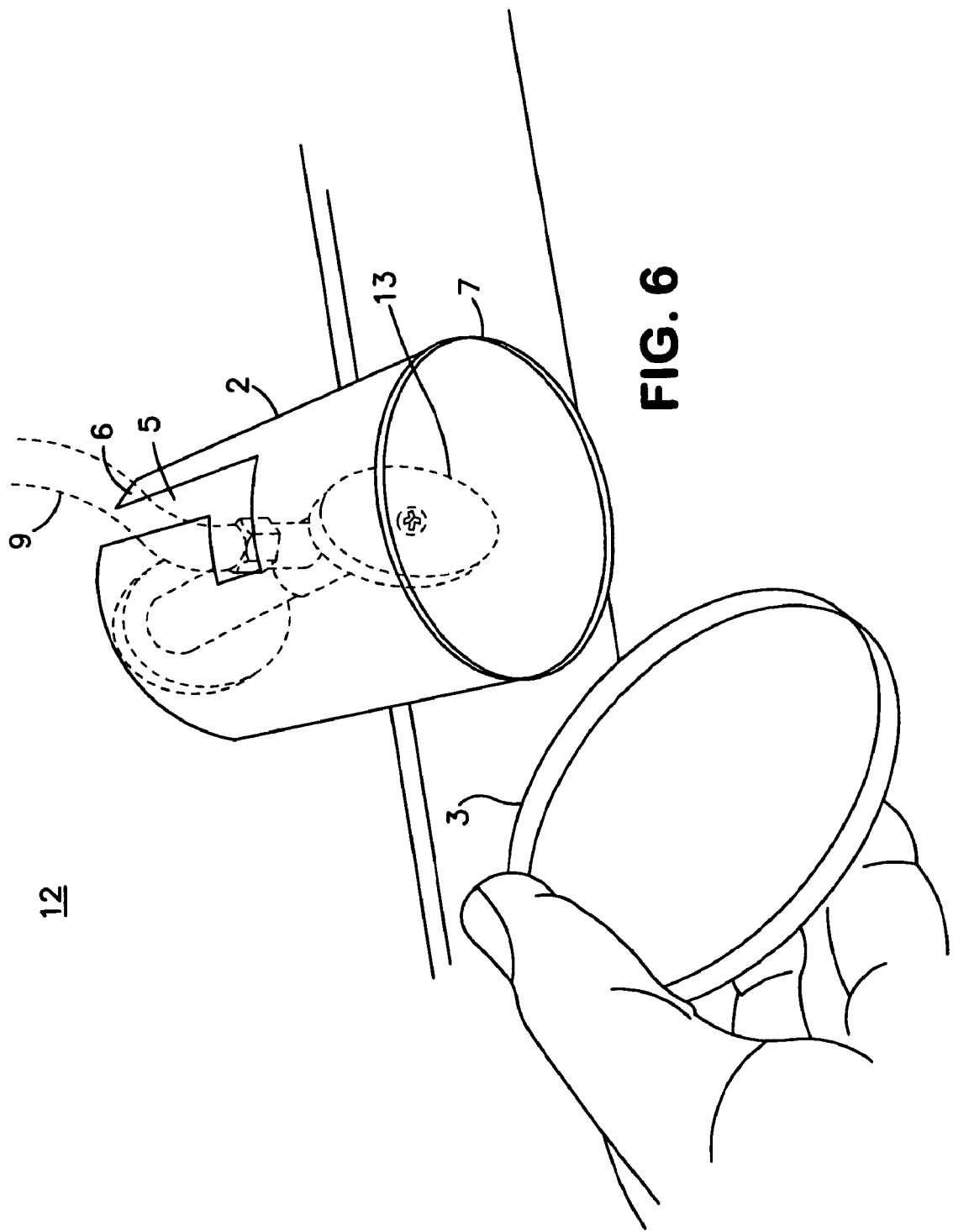
FIG. 6 is perspective view of a shut off cover of the invention in place over a shut off valve and without the cover.
Figure 7:
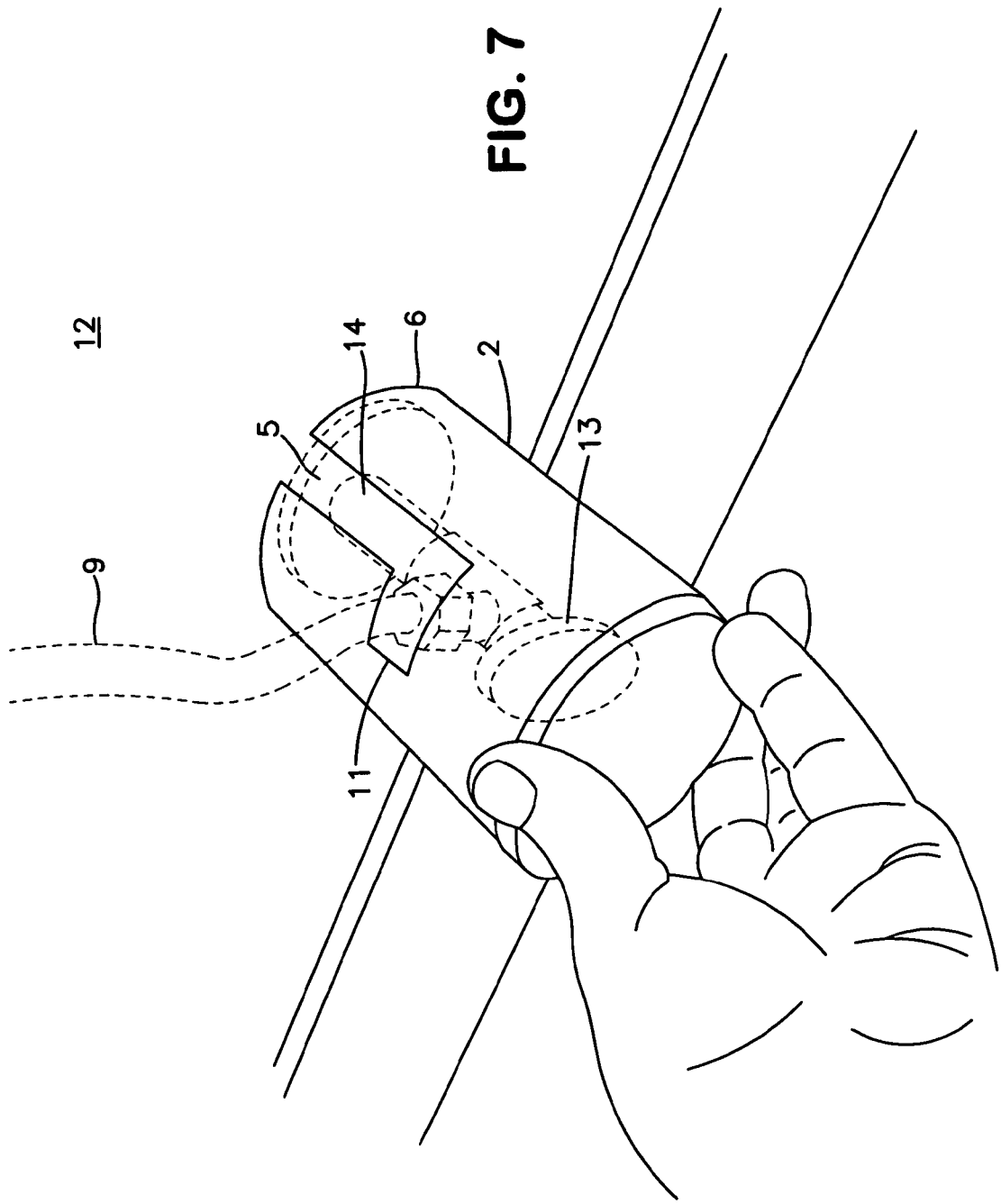
FIG. 7 is perspective view like FIG. 6 and with the cover.

As is evident when viewing FIG. 5, colored cylindrical members 2 are useful to protect and enhance the appearance of pipes 9, 14 and valves 13 by covering them with an easily attached and removable member. FIGS. 6 and 7 depict pipes 9, 14 and valve 13 that extend from the base of a wall and extend to, for example, a commode tank (not shown). A plastic cylindrical member may be made from a material having color homogenously dispensed throughout so that scratching or cutting of the cylindrical member reveals a section of substantially the same color as the surface of the cylindrical member. Thus, even as the shut off cover wears with repeated use such wear will not be noticeable. This is also the case wherein the cylindrical member is made from brass or polished aluminum. That is, abrading or cutting of the member will not reveal a markedly different color and thus detract from the decorative appearance of the shut off cover.

Figure 8:
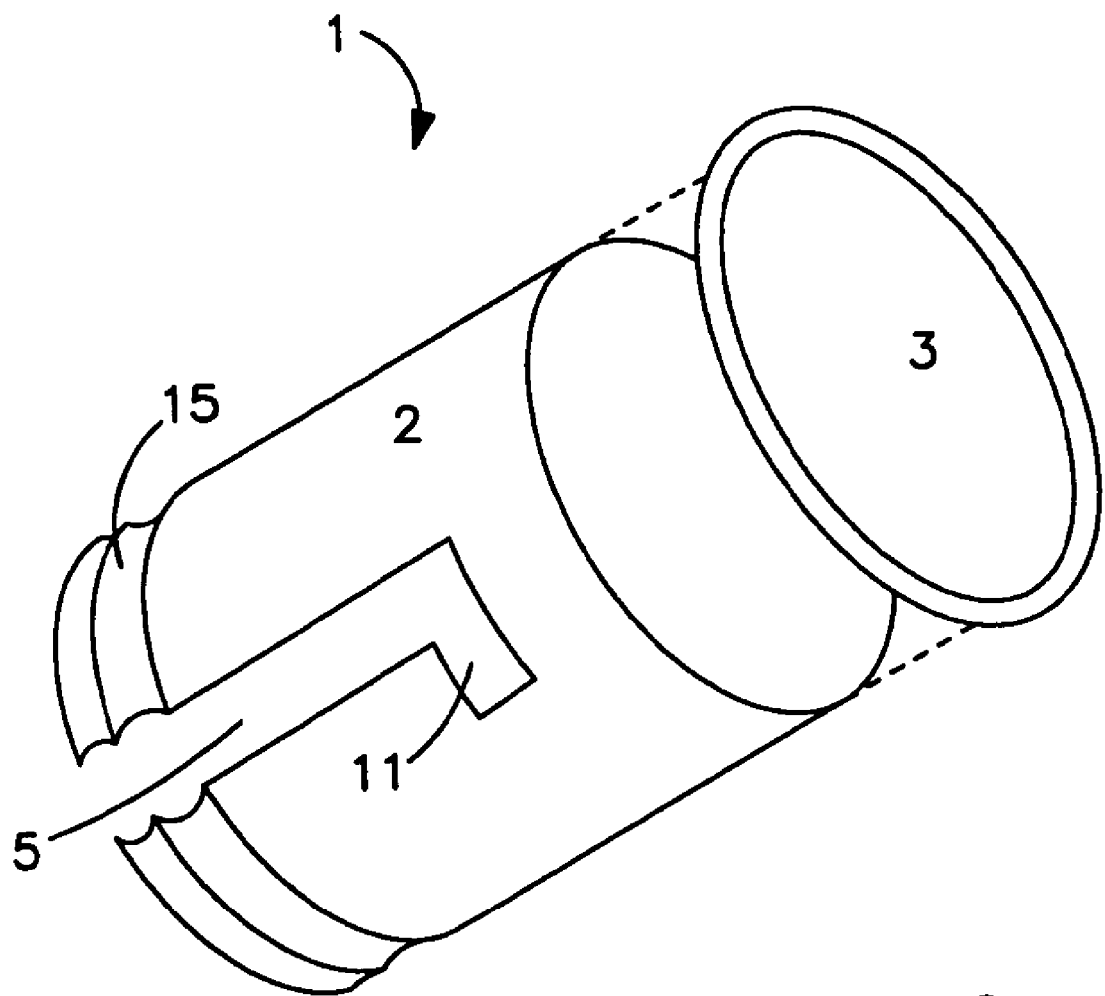
FIG. 8 is perspective view of an embodiment of the invention having a flexible end surface.

FIG. 8 is perspective view of an embodiment of the invention having a flexible end surface. In many instances where the plumbing (pipes 9, 14 and valve 13) are visible, the valve is relatively close to the wall 12. In order for the cylindrical member 2 to fit closely to the wall when base 11 is engaged by pipe 9, end 6 may be provided with a flexible member like bellows 15. Flexible bellows 15 flexes as the cylindrical member 2 is forced against wall 12 and pipe 9 is located in base 11. When pipe 9 reaches and is engaged by base 11 of the "L" portion of channel 5 the cylindrical member 2 is firmly held in position by compressed resilient bellows 15. Other flexible ends like flexible rubber or plastic may be fitted to the end 6 as by a snap fit, adhesive bonding, etc. The end 6 may be provided with protrusions like protrusions 8 that permit compression of the end 6 so that base 11 of the "L" portion can be fit to the pipe 9.

In order that the cylindrical member 2 fit to a variety of pipe configurations, it is possible to provide a cylindrical member 2 with a base 11 of the "L" portion being adjustably located. In FIG. 2 perforated removable sections 16, 17 and 18 are provided to enable the cylindrical member 2 to be fit to different possible pipe 9 configurations. If pipe 9 is close to the wall portion 16 can be removed to provide base 11 for the pipe 9. If pipe 9 is further from the wall then portion 17 can be removed to provide a proper fit for pipe 9 in base 11. Alternatively, the walls of channel 5 can be provided so as to enable the base 11 to be cut out by a knife for proper location on the cylindrical member. This may occur by, for example, common molding techniques wherein the portion of the cylindrical member adjacent channel 5 is made from thinner and/or more flexible material. The removable section(s) may be delineated by markings on the cylindrical member indicating portions to be removed. The markings are removable via washing with plain water and/or with a solvent. Section 18 is separable from cylindrical member 2 on three sides and remains affixed to cylindrical member 2 at line 19. After separation along the three sides the shut off cover 1 is fit to the pipe 9 with the section 18 flexibly held open until pipe 9 is in the base 11 then the disconnected end of removed portion 18 may be placed back into base 11 so that the remaining portion 18 holds pipe 9 in base 11. This is possible where portion 18 is made from flexible yet strong material like rubber or plastic which enables it to be removed and replaced as noted above. If desired the free end of portion 18 can be cut off to permit portion 18 to substantially planar with the surface of cylindrical member 2 with pipe 9 in base 11. The phrase "cut off" is herein defined as being of a material so that a section of the material can be cut with the aid of a household knife, box cutter or scissors.

Cap 3 may advantageously be embossed with words such as "shut off valve" to identify the location of the shut off valve. Embossing the words minimally detracts from the appearance of the shut off cover. One simple way of providing embossed words is by molding each cover with the words being provided by a mold insert so that a stamped or embossed effect is produced. Other decorative features may also be molded or embossed into the cap 3 or cylindrical member 2. The cylindrical member may be provided with more than one cap 3, each cap 3 having a different appearance. For example, one cap 3 may have an animal (duck, etc.) embossed, imprinted or otherwise affixed to provide decoration for a juvenile and another cap 3 may have no decoration other than the coloring as noted above, or perhaps be provided with a more adult design pattern (egg and dart, etc.). For example, FIG. 3 shows two caps 3, one plain and the other in the shape of a dog.

The shut off cover 1 depicted in the present drawings is about 3½ to 4 inches in length (i.e., from end 6 to opposite end 7) and the inside circumference is about 3½ to 4 inches in diameter (measured from an inside surface point on cylindrical member 2 through the longitudinal axis 4 to a corresponding opposite point on cylindrical member 2). These dimensions may vary to accommodate valves of different size and pipes at varying distances from the wall.

Base 11 shown in the drawings is depicted as extending only a short distance along the circumference of cylindrical member 2. It is advantageous to provide base 11 to extend up to about 180° around the circumference of the cylindrical member so that the when pipe 9 is in base 11 the shut off cover 1 can be rotated sufficiently to hide channel 5 from plain view. That is, sufficient rotation is possible to place channel 5 on a side or bottom of the installed shut off cover so as to be out of sight. Of course base 11 can extend either clockwise or counter-clockwise from channel 5.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A shut off cover for installation over a shut off valve with a supply pipe comprising,
   a hollow cylindrical member having a longitudinal axis and a cylindrical wall, the cylindrical wall having a channel extending generally along the longitudinal axis from an end of the cylindrical wall toward, but short of, an opposite end of the cylindrical wall,
   wherein the channel includes a portion capable of frictionally gripping the supply pipe to hold the cylindrical member in place, and
   wherein substantially the entire end of the cylindrical wall comprises a compressible resilient member,
   wherein the channel is an L-shaped channel with the base of the L extending circumferentially about the hollow cylindrical member.

2. The shut off cover of claim 1 wherein the cylindrical member is made of metal.

3. The shut off cover of claim 1 wherein the cylindrical member is made of a flexible plastic material that can be cut off.

4. The shut off cover of claim 1 wherein the channel has protuberances extending into the channel.

5. The shut off cover of claim 4 wherein the protuberances are fibers.

6. The shut off cover of claim 4 wherein the protuberances are flexible bumps having rounded ends extending inwardly into the channel.

7. The shut off cover of claim 1 further including a cap removably closing the opposite end of the cylindrical wall.

8. The shut off cover of claim 7 wherein the cap is removably attached via a snap fit or a threaded connection.

9. The shut off cover of claim 1 wherein the exterior surface of the cylindrical member is: a) a painted surface, b) a brass surface, or c) a polished aluminum surface.

10. The shut off cover of claim 1 wherein the cylindrical member is made from a material having color homogenously dispensed throughout so that scratching or cutting of the cylindrical member reveals a section of substantially the same color as the surface of the cylindrical member.

11. The shut off cover of claim 1 wherein the cylinder is about 3½ to 4 inches in length from the end to the opposite end and has an inside circumference of about 3½ to 4 inches in diameter.

12. The shut off cover of claim 1 wherein the hollow cylindrical member has at least one removable section extending generally perpendicular to the channel which when removed forms, in combination with the channel, the L-shaped channel with the base of the L extending circumferentially about the hollow cylindrical member.

13. The shut off cover of claim 12 wherein the removable section is delineated by perforations in the cylindrical member.

14. The shut off cover of claim 12 wherein the removable section is delineated by markings on the cylindrical member indicating portions to be removed.

15. The shut off cover of claim 1 wherein the base of the L extends circumferentially about 45° to 180° about the hollow cylindrical member.

16. The shut off cover of claim 1 wherein the exterior surface of the cylindrical member is: a) a decal, b) an appliqué, or c) wall paper.

* * * * *